US012753555B2

(12) United States Patent
Bhardwaj et al.

(10) Patent No.: US 12,753,555 B2
(45) Date of Patent: Oct. 6, 2026

(54) POLYLACTIDE FORMULATION FOR IMPROVED EXTRUSION PROCESSING

(71) Applicant: WestRock MWV, LLC, Atlanta, GA (US)

(72) Inventors: Rahul Bhardwaj, Glen Allen, VA (US); Chitai C. Yang, Glen Allen, VA (US); Justin L. Bennett, Richmond, VA (US); Courtney R. Johnson, Midlothian, VA (US)

(73) Assignee: WestRock MWV, LLC, Atlanta, GA (US)

( * ) Notice: Subject to any disclaimer, the term of this patent is extended or adjusted under 35 U.S.C. 154(b) by 651 days.

(21) Appl. No.: 18/248,286

(22) PCT Filed: Dec. 8, 2021

(86) PCT No.: PCT/US2021/062462
§ 371 (c)(1),
(2) Date: Apr. 7, 2023

(87) PCT Pub. No.: WO2022/125696
PCT Pub. Date: Jun. 16, 2022

(65) Prior Publication Data

US 2023/0374734 A1 Nov. 23, 2023

Related U.S. Application Data

(60) Provisional application No. 63/124,162, filed on Dec. 11, 2020.

(51) Int. Cl.
*D21J 1/08* (2006.01)
*B32B 1/00* (2006.01)
(Continued)

(52) U.S. Cl.
CPC .................................... *D21J 1/08* (2013.01); *B32B 1/00* (2013.01); *B32B 27/10* (2013.01); *B32B 27/18* (2013.01);
(Continued)

(58) Field of Classification Search
CPC ... D21J 1/08; B32B 1/00; B32B 27/10; B32B 27/18; B32B 27/36; B32B 2250/02;
(Continued)

(56) References Cited

U.S. PATENT DOCUMENTS

2010/0021751 A1* 1/2010 Harrison .................. C08K 5/41 524/48
2014/0147604 A1* 5/2014 Nevalainen ............ D21H 19/28 525/186
2016/0010281 A1 1/2016 Skupin et al.

OTHER PUBLICATIONS

International Searching Authority: International Search Report and Written Opinion, Intl. App. No. PCT/US2021/062462 (Mar. 15, 2022).

* cited by examiner

*Primary Examiner* — James C Yager
(74) *Attorney, Agent, or Firm* — Neil G. Cohen; Rohini K. Garg

(57) ABSTRACT

A paperboard structure includes a paperboard substrate having a first surface and an opposed second surface. A biopolymer coating is applied by extrusion or co-extrusion to at least one of the first surface and the second surface. The biopolymer coating includes an inorganic melt curtain stabilizer, a polylactide resin having a melt flow index, and an organic polymeric chain extender.

20 Claims, 2 Drawing Sheets

(51) Int. Cl.

| | |
|---|---|
| ***B32B 27/10*** | (2006.01) |
| ***B32B 27/18*** | (2006.01) |
| ***B32B 27/36*** | (2006.01) |
| ***B65D 65/42*** | (2006.01) |
| ***B65D 65/46*** | (2006.01) |
| ***C09D 7/61*** | (2018.01) |
| ***C09D 167/04*** | (2006.01) |
| ***D21H 19/40*** | (2006.01) |
| ***D21H 19/62*** | (2006.01) |
| ***D21H 19/84*** | (2006.01) |
| ***D21H 23/48*** | (2006.01) |

(52) U.S. Cl.

CPC .............. *B32B 27/36* (2013.01); *B65D 65/42* (2013.01); *B65D 65/466* (2013.01); *C09D 7/61* (2018.01); *C09D 167/04* (2013.01); *D21H 19/40* (2013.01); *D21H 19/62* (2013.01); *D21H 19/84* (2013.01); *D21H 23/48* (2013.01); *B32B 2250/02* (2013.01); *B32B 2264/102* (2013.01); *B32B 2270/00* (2013.01); *B32B 2307/31* (2013.01); *B32B 2307/716* (2013.01); *B32B 2439/02* (2013.01)

(58) Field of Classification Search

CPC .......... B32B 2264/102; B32B 2270/00; B32B 2307/31; B32B 2307/716; B32B 2439/02; B32B 2264/1021; B32B 2264/1023; B32B 2264/1026; B32B 2264/1027; B32B 2264/104; B32B 2264/107; B32B 2307/7163; B32B 2307/718; B32B 7/12; B32B 27/20; B32B 27/22; B32B 29/002; D21H 17/36; D21H 27/74; D21H 19/56; D21H 23/22; D21H 27/10; D21H 19/40; D21H 19/62; D21H 19/84; D21H 23/48; B65D 65/42; B65D 65/466; C09D 7/61; C09D 167/04

See application file for complete search history.

POLYLACTIDE FORMULATION FOR IMPROVED EXTRUSION PROCESSING

PRIORITY

This application is the U.S. national phase entry of Intl. App. No. PCT/US2021/062462 filed on Dec. 8, 2021, which claims priority from U.S. Ser. No. 63/124,162 filed on Dec. 11, 2020. The entire contents of Intl. App. No. PCT/US2021/062462 and U.S. Ser. No. 63/124,162 are incorporated herein by reference.

FIELD

The present application relates to the field of coatings for paperboard containers and, more particularly, to biopolymer coatings for improved extrusion processing.

BACKGROUND

Paperboard is used in various packaging applications, such as containers, folding cartons, and trays. For example, paperboard is used in the food and beverage industry to form paperboard cups for holding hot or cold beverages.

Paperboard containers for holding liquids typically require enhanced liquid barrier properties on an interior surface of the cup to minimize absorption of liquid from the beverage into the paperboard substrate. Thus, it is often desired to provide a packaging structure with a polymeric coating. Such polymeric coatings may impart durability, moisture resistance, and other useful properties such as heat-sealability. Recently there is increasing interest in using biopolymers for the polymer coating in such packaging structures. One popular biopolymer is polylactic acid (PLA). PLA biopolymer, an aliphatic polyester, is challenging for extrusion coating due to processing issues like edge weave, draw resonance and neck-in. These problems result in uneven coating and excessive material waste during extrusion coating process.

Accordingly, those skilled in the art continue with research and development in the field of coatings for paperboard containers.

SUMMARY

Disclosed are biopolymer coatings.

In one example, the disclosed biopolymer coating includes an inorganic melt curtain stabilizer, a polylactide resin having a melt flow index, and an organic polymeric chain extender.

In another example, the disclosed biopolymer coating includes an inorganic melt curtain stabilizer, a polylactide resin having a melt flow index, another, different polylactide resin having a different melt flow index, and an organic polymeric chain extender.

In yet another example, the disclosed biopolymer coating includes an inorganic melt curtain stabilizer, a polylactide resin having a melt flow index, a biodegradable polyester, and an organic polymeric chain extender.

Also disclosed are paperboard structures that include one or more biopolymer coatings.

In one example, the disclosed paperboard structure includes a paperboard substrate having a first surface and an opposed second surface. A biopolymer coating is applied by extrusion or co-extrusion to at least one of the first surface and the second surface. The biopolymer coating includes an inorganic melt curtain stabilizer, a polylactide resin having a melt flow index, and an organic polymeric chain extender.

In another example, the disclosed paperboard structure includes a paperboard substrate having a first surface and an opposed second surface. A biopolymer coating is applied by extrusion or co-extrusion to at least one of the first surface and the second surface. The biopolymer coating includes an inorganic melt curtain stabilizer, a polylactide resin having a melt flow index, another, different polylactide resin having a different melt flow index, and an organic polymeric chain extender.

In yet another example, the disclosed paperboard structure includes a paperboard substrate having a first surface and an opposed second surface. A biopolymer coating is applied by extrusion or co-extrusion to at least one of the first surface and the second surface. The biopolymer coating includes an inorganic melt curtain stabilizer, a polylactide resin having a melt flow index, a biodegradable polyester, and an organic polymeric chain extender.

Other examples of the disclosed biopolymer coatings and disclosed paperboard structures will become apparent from the following detailed description, the accompanying drawings and the appended claims.

DETAILED DESCRIPTION

Detailed descriptions of specific embodiments of the paperboard structure and biopolymer coatings are disclosed herein. It will be understood that the disclosed embodiments are merely examples of the way in which certain aspects of the invention can be implemented and do not represent an exhaustive list of all the ways the invention may be embodied. As used herein, the word "exemplary" is used expansively to refer to embodiments that serve as illustrations, specimens, models, or patterns. It will be understood that the paperboard structure and biopolymer coatings described herein may be embodied in various and alternative forms. Any specific structural and functional details disclosed herein are not to be interpreted as limiting, but merely as a basis for the claims and as a representative basis for teaching one skilled in the art to variously employ the invention.

The disclosed addresses various processing defects common with prior art coating compositions. In one or more examples, the disclosed remedies a processing defect of edge weave that results in excess waste material. Edge weave is where the edges of a curtain of biopolymer coating waver sideways such that the width of the coating varies along the substrate upon which it is applied. This wavering of the curtain is exhibited by wavy edges of the coated portion on a paperboard substrate. With non-uniform coverage at the edges of the curtain, more of the sides of the substrate are trimmed as waste.

In one or more examples, the disclosed biopolymer compositions address the runnability issue of PLA resin as it is prone to not only edge weave, but is further prone to neck in and draw resonance (un even coating), especially when extruding PLA at lower coat weight. In one expression, the disclosed biopolymer coatings include a PLA resin. In another expression, the disclosed biopolymer coatings include blends of different types of PLA resins having different melt flow indexes. The various PLA resin compositions can be blended in conjunction with a filler and a reactive additive. The resultant disclosed compositions demonstrate superior melt stability and hence enable the coatings to run at lower coat weights while reducing common deficiencies such as edge weave, neck-in, and draw resonance. In yet another expression, the disclosed biopolymer coatings include a blend of one or more PLA resins and one or more biodegradable polyesters.

In one or more examples, it is disclosed that the blending of different compositions of PLA having different melt flow indexes in the presence of mineral filler, talc, and a polymeric chain extender additive yields substantial improvement over prior art compositions. In one or more examples, the disclosed coatings have a coat weight of approximately 16 pounds per 3000 $ft^2$. The disclosed PLA mixtures allow for improvements in tuning extrusion process parameters such as motor load and head pressure for stable extrusion process.

Figure 1:
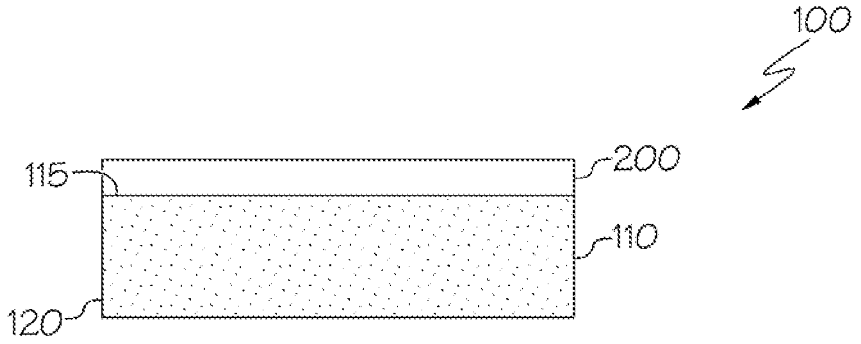
FIG. 1 is a cross-sectional view of a paperboard structure.

FIG. 1 illustrates an exemplary embodiment of a paperboard structure 100 comprised of a paperboard substrate 110 and a biopolymer coating 200. Paperboard substrate 110 of paperboard structure 100 comprises a first surface 115 and a second surface 120 opposed from the first surface 115. Examples of appropriate paperboard substrate 110 materials include corrugating medium, linerboard, solid bleached sulfate (SBS), unbleached kraft, and folding boxboard (FBB). The biopolymer coating 200 may be applied to the first surface 115 of paperboard substrate 110, the second surface 120 of paperboard substrate 110, or to both the first surface 115 and the second surface 120 of the paperboard substrate 110. In one or more examples, the paperboard structure 100 is assembled into a container, such as a drinking cup.

In one or more examples, the biopolymer coating 200 comprises more than one type of PLA resin. In one or more examples, a first PLA resin is a high molecular weight, amorphous resin having melt flow of about 6 g/10 min at 210° C./2.16 kg, as tested per ISO 1133-A test method. In one or more examples, a second PLA resin is a high molecular weight resin having melt flow of about 6 g/10 min at 210° C./2.16 kg, as tested per ASTM 1238 test method. In one or more examples, the biopolymer coating 200 comprises three or more types of PLA resin. In one or more examples, a third PLA resin is a moderate molecular weight resin having melt flow of about 14 g/10 min at 210° C./2.16 kg, as tested per ASTM 1238 test method.

In an example, the biopolymer coating 200 comprises a blend having more than one type of PLA resin. In one or more examples, the melt flow index of a PLA resin in the blend is approximately 4-8 g/10 min at 210° C./2.16 kg. In one or more examples, the melt flow index of a different PLA resin in the blend is approximately 12-16 g/10 min at 210° C./2.16 kg. In one or more examples, the melt flow index of a PLA resin in the blend is 5-7 g/10 min at 210° C./2.16 kg. In one or more examples, the melt flow index of a different PLA resin in the blend is 13-15 g/10 min at 210° C./2.16 kg.

In one or more examples, the biopolymer coating 200 comprises a biodegradable polymer, such as a biodegradable polyester. For example, the biopolymer coating 200 may comprise Biopolyester AP01, which is a biodegradable, partially biobased copolyester commercially available from BASF of Ludwigshafen, Germany.

In one or more examples, the biopolymer coating 200 comprises an inorganic melt curtain stabilizer, or mineral filler. In one or more examples, the inorganic melt curtain stabilizer 230 comprises at least one of calcium carbonate, talc, mica, diatomaceous earth, silica, clay, kaolin, wollastonite, pumice, zeolite, ceramic spheres or any other inorganic platy material having comparable material properties. In one or more examples, the inorganic melt curtain stabilizer comprises talc.

In one or more examples, the biopolymer coating 200 comprises an organic polymeric chain extender. In one or more examples, the organic polymeric chain extender has a low epoxy equivalent weight, such that it has a high number of epoxy groups per chain. The organic polymeric chain extender interacts with the chain ends of the first PLA resin, second PLA resin, and third PLA resin to effectively increase the melt viscosity of each PLA resin, respectively.

Several combinations of the above-mentioned components may be used to form biopolymer coating 200. In one or more examples, the biopolymer coating is heat sealable. In one or more examples, biopolymer coating 200 is a three component blend comprised of a PLA resin having a melt flow index, a different PLA resin having a different melt flow index, and a PLA blend. In one or more examples, the PLA blend comprises a PLA having a melt flow index, an inorganic melt curtain stabilizer, and an organic polymeric chain extender. In one or more examples, the PLA blend comprises approximately 60% of a PLA having a melt flow index of about 14 g/10 min at 210° C./2.16 kg, approximately 40% talc, and approximately 0.4% of an organic polymeric chain extender. In one or more examples, the biopolymer coating 200 is comprised of approximately 40% a PLA resin having a melt flow index of about 6 g/10 min at 210° C./2.16 kg, approximately 35% a different PLA resin having a melt flow index of about 6 g/10 min at 210° C./2.16 kg, and approximately 25% of a PLA blend wherein the PLA blend comprises 60% of a PLA having a melt flow index of about 14 g/10 min at 210° C./2.16 kg, approximately 40% talc, and approximately 0.4% of an organic polymeric chain extender.

In one or more examples, the biopolymer coating 200 is a four component blend comprised of a PLA resin having a melt flow index, a different PLA resin having a different melt flow index, a third PLA resin having a melt flow index, and a PLA blend. In one or more examples, the PLA blend comprises a PLA resin having a melt flow index, an inorganic melt curtain stabilizer, and an organic polymeric chain extender. In one or more examples, the PLA blend comprises approximately 60% of a PLA resin having a melt flow index of about 14 g/10 min at 210° C./2.16 kg, approximately 40% talc, and approximately 0.4% of an organic polymeric chain extender. In one or more examples, the biopolymer coating 200 is comprised of approximately 40% a PLA resin having a melt flow index of about 6 g/10 min at 210° C./2.16 kg, approximately 35% a different PLA resin having a melt flow index of about 6 g/10 min at 210° C./2.16 kg, approximately 10% a third PLA resin having a melt flow index of about 14 g/10 min at 210° C./2.16 kg, and approximately 25% a PLA blend. In one or more examples, the PLA blend comprises 60% of a PLA resin having a melt flow index of about 14 g/10 min at 210° C./2.16 kg, approximately 40% talc, and approximately 0.4% of an organic polymeric chain extender.

In one or more examples, the biopolymer coating 200 comprises at least two different PLA resins having different melt flow indexes. In one or more examples, the melt flow index of a PLA resin is at least 10 percent greater than a different melt flow index of a different PLA resin. In one or more examples, the melt flow index of a PLA resin is at least 20 percent greater than a different melt flow index of a different PLA resin. In one or more examples, the melt flow index of a PLA resin is at least 40 percent greater than a different melt flow index of a different PLA resin. In one or more examples, the melt flow index of a PLA resin is at least 60 percent greater than a different melt flow index of a different PLA resin.

In one or more examples, the biopolymer coating 200 comprises at least two different PLA resins having different melt flow indexes. In one or more examples, a difference between the melt flow index of a PLA resin and the different melt flow index of a different PLA resin is at least 2 g/10 min at 210° C./2.16 kg. In one or more examples, the difference between the melt flow index of a PLA resin and the different melt flow index of a different PLA resin is at least 4 g/10 min at 210° C./2.16 kg. In one or more examples, the difference between the melt flow index of a PLA resin and the different melt flow index of a different PLA resin is at least 6 g/10 min at 210° C./2.16 kg. In one or more examples, the difference between the melt flow index of a PLA resin and the different melt flow index of a different PLA resin is at least 8 g/10 min at 210° C./2.16 kg.

In one or more examples, the biopolymer coating 200 comprises at least one PLA resin and at least one biodegradable polymer, such as a biodegradable polyester. In one or more examples, the biopolymer coating 200 comprises at least two different PLA resins having different melt flow indexes and at least one biodegradable polymer, such as a biodegradable polyester. In addition to the at least one PLA resin and the at least one biodegradable polymer, the biopolymer coating 200 may further comprise an inorganic melt curtain stabilizer and/or an organic polymeric chain extender.

The disclosed blended compositions of biopolymer coating 200 allow for extrusion at lower coat weights. In one or more examples, the coat weight of the biopolymer coating is below 18 pounds per 3000 $ft^2$. In one or more examples, the coat weight of the biopolymer coating is below 16 pounds per 3000 $ft^2$. In one or more examples, the coat weight of the biopolymer coating is below 14 pounds per 3000 $ft^2$.

In one or more examples, the disclosed compositions of biopolymer coating 200 have various melt flow indexes based upon the amount of each PLA. In one or more examples, the biopolymer coating 200 has a melt flow index below about 14 g/10 min at 210° C./2.16 kg. In one or more examples, the biopolymer coating has a melt flow index below about 12 g/10 min at 210° C./2.16 kg. In one or more examples, the biopolymer coating 200 has a melt flow index below about 10 g/10 min at 210° C./2.16 kg.

Figure 2:
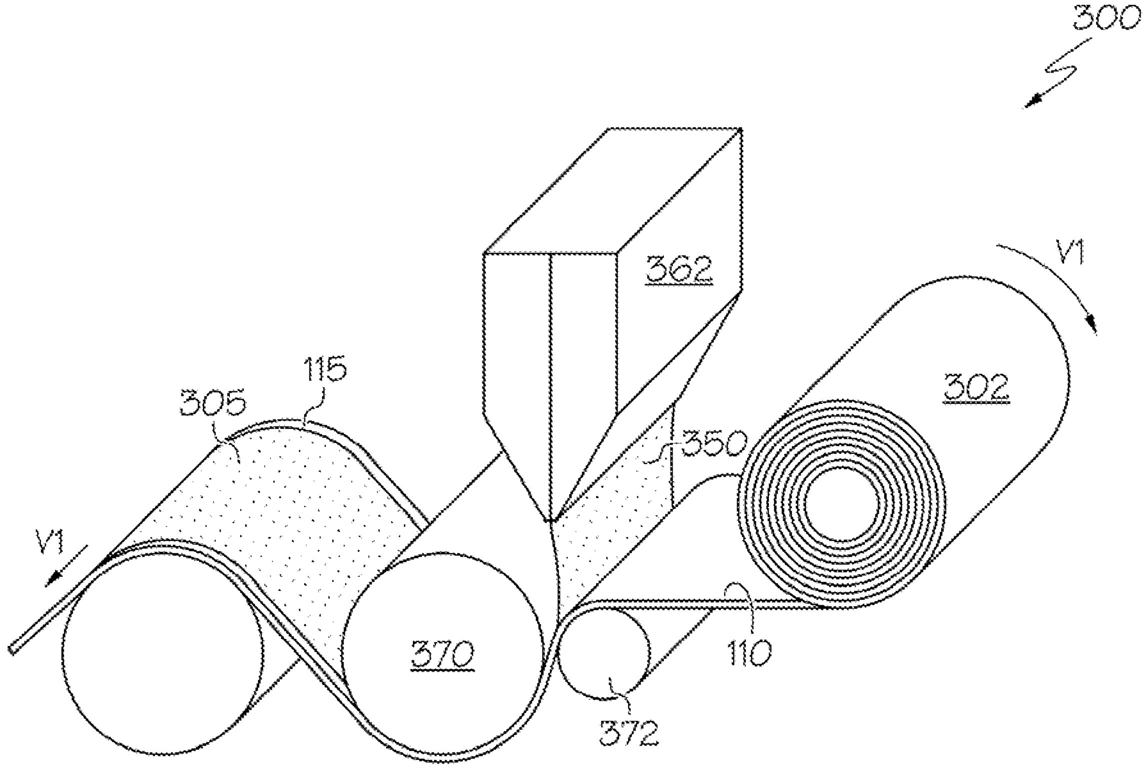
FIG. 2 is a perspective view of an extrusion coater.

In one or more examples, FIG. 2 illustrates an exemplary simplified drawing of an extrusion coater 300 comprising an extruder die 362. Extruder die 362 applies a curtain 350 of biopolymer coating 200 onto paperboard substrate 110. The curtain 250 of biopolymer coating 200 is unrolled at a linear speed V1 from feed roll 302. The paperboard substrate 110 and curtain 350 are pressed together in a nip between pressure roll 372 and chill roll 370 which cools the polymer before the coated paperboard 305 moves on to another step in the process.

Figure 3:
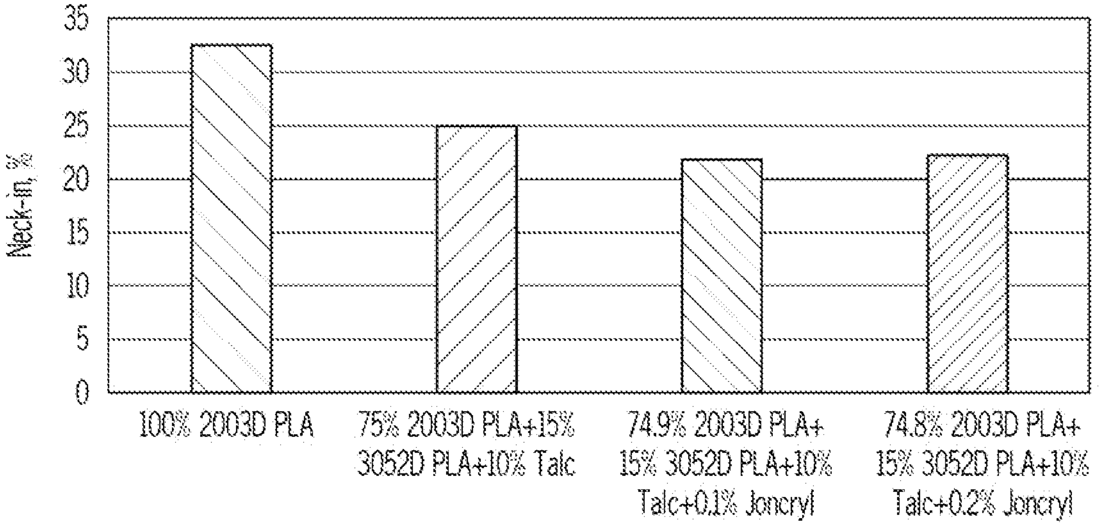
FIG. 3 is a graph of percent neck-in of various biopolymer compositions.
Figure 4:
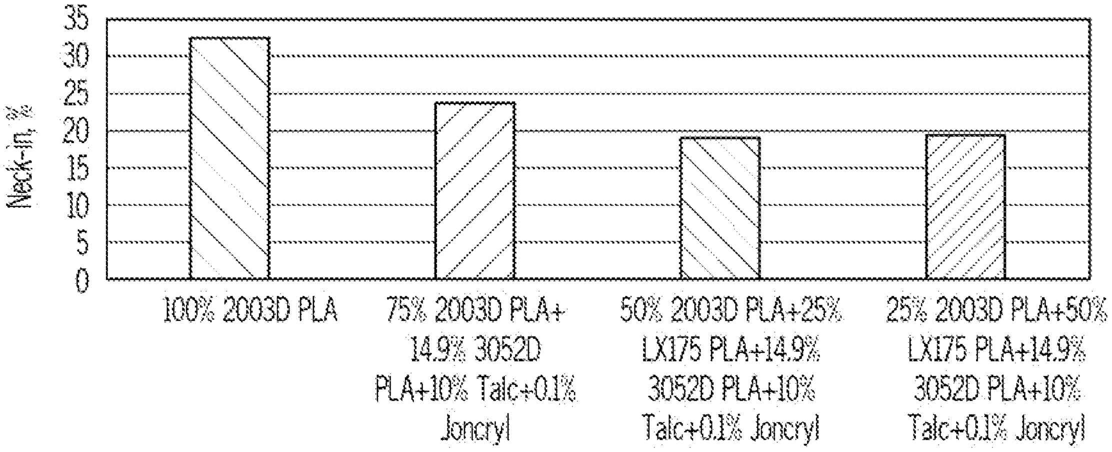
FIG. 4 is a graph of percent neck-in of various biopolymer compositions.

FIG. 3 and FIG. 4 illustrate graphs of percent neck-in of four different compositions of biopolymer coating 200 applied to a paperboard substrate 110. FIG. 3 illustrates percent neck-in at 22 inch die/240 fpm/16 pounds per 3000 $ft^2$ for four different biopolymer coating 200 compositions and FIG. 4 illustrates the same for three different biopolymer coating 200 composition as compared to a control coating of 100% single PLA. As shown in the graphs, blending different PLA resin compositions having different melt flow indexes with an inorganic melt curtain stabilizer and an organic polymeric chain extender results in a reduction of percent neck-in. In one or more examples, FIG. 3 and FIG. 4 illustrate that the addition of approximately 0.1% of an organic polymeric chain extender, such as Joncryl®, with a blend of different PLA resin compositions having different melt flow indexes lowers the percent neck-in. The following experimental examples demonstrate one or more examples of the material properties of the disclosed biopolymer coating 200 compositions.

EXPERIMENTAL EXAMPLES

Experiments were conducted to evaluate the material properties of various biopolymer coating compositions. The biopolymer coating compositions were made using the following commercially-available components. The PLA components used during experimentation were: Total-Corbion Luminy® LX175 of Rayong, Thailand; NatureWorks Ingeo™ 2003D of Minnetonka, MN, USA; and NatureWorks Ingeo™ 3052D of Minnetonka, MN, USA. The polymeric chain extender used during experimentation was BASF Joncryl® 4468 of Ludwigshafen, Germany. The biodegradable polymer used during experimentation was Biopolyester AP01 from BASF of Ludwigshafen, Germany.

All coatings were extruded on 18 pt. cup stock grade paperboard for testing. Rheology measurements were taken under the following conditions. ASTM D4440 was used to characterize the resin viscosity using parallel plate rheology testing. Equipment used during experimentation included an AR-2000ex (TA Instruments) rheometer. The Conditioning Equilibration Time was approximately 2 minutes. Testing included an Angular Frequency Sweep at 0.01 to 600 rad/sec at 3 Pa stress controlled in log mode. The number of points/decade was 5. Temperature was set to approximately 185° C. The gap was approximately 1000 μm. The plot consisted of G' (Pa) vs. % Strain, converted to Cox-Merz-Viscosity (Pa·s) vs. Shear Rate (1/s). Table 1 illustrates viscosity measurements obtained at 185° C. at below shear rates for three different PLA resins.

TABLE 1

| | Viscosity (Pa · s) obtained at 185° C. at below shear rates | | | | |
|---|---|---|---|---|---|
| PLA Resin | 0.01 1/s | 0.1 1/s | 1.0 1/s | 10 1/s | 100 1/s |
| 100% 2003 D | 5787 | 5183 | 5010 | 3938 | 1719 |
| 100% LX175 | 3457 | 3273 | 3150 | 2625 | 1408 |
| 100% 3052D | 1815 | 1584 | 1519 | 1411 | 974.7 |

Table 2 illustrates viscosity measurements obtained at 185° C. at below shear rates for three different blends of PLA, inorganic melt curtain stabilizer, and organic polymeric chain extender. As illustrated below, the viscosity of 100% 2003D-Extruded PLA is higher than the viscosity of the three PLA blends tested. The viscosity of the 75% 2003D PLA+14.9% 3052D PLA+10% Talc+0.1% Joncryl blend is approximately half of the viscosity of 100% 2003D-Extruded PLA.

TABLE 2

| Formulation | Viscosity (Pa · s) obtained at 185° C. at below shear rates 0.01 1/s | 0.1 1/s | 1.0 1/s | 10 1/s | 100 1/s |
|---|---|---|---|---|---|
| 100% 2003D- Extruded PLA | 4303 | 4133 | 3986 | 3188 | 1452 |
| 75% 2003D PLA + 14.9% 3052D PLA + 10% Talc + 0.1% Joncryl | 1628 | 1387 | 1340 | 1138 | 760.9 |
| 40% LX175 + 35% 2003D + 14.9% 3052D PLA + 10% Talc + 0.1% Joncryl | 2870 | 2653 | 2544 | 2110 | 1079 |
| 35% LX175 + 30% 2003D + 24.9% 3052D PLA + 10% Talc + 0.1% Joncryl | 2549 | 2422 | 2347 | 1978 | 1101 |

Table 3 illustrates the percent neck-in of 100% 2003D PLA compared to the percent neck-in of three other PLA blends. As shown in Table 3, the percent neck-in of 100% 2003D PLA is higher than the perfect neck-in of the three PLA blends. Further, Table 3 illustrates coat width variability (in inches) of 100% 2003D PLA as compared to the three PLA blends.

TABLE 3

| Formulation | Neck-in, % | Coat Width Variability, inches |
|---|---|---|
| 100% 2003D PLA | 32.47 | 0.65 |
| 75% 2003D PLA + 15% 3052D PLA + 10% Talc | 25.02 | 0.06 |
| 40% LX175 + 35% 2003D + 14.9% 3052D PLA + 10% Talc + 0.1% Joncryl | 18.72 | 0.03 |
| 35% LX175 + 30% 2003D + 24.9% 3052D PLA + 10% Talc + 0.1% Joncryl | 19.14 | 0.02 |

Table 4 illustrates the percent neck-in of 100% 2003D PLA compared to the percent neck-in of three other biopolymer coatings. As shown in Table 4, the best result for both neck-in and coat width variability is seen when a biodegradable polymer (Biopolyester) is used in combination with a PLA blend, talc, and Joncryl.

TABLE 4

| Formulation | Neck-in, % | Coat Width Variability, inches |
|---|---|---|
| 100% 2003D PLA | 32.47 | 0.65 |
| 75% 2003D PLA + 15% 3052D PLA + 10% Talc | 29.1 | 0.23 |
| 75% 2003D + 9.9% LX175 + 10% Talc + 5% Biopolyester + 0.1% Joncryl | 29.2 | 0.05 |
| 75% 2003D + 19.9% LX175 + 5% Biopolyester + 0.1% Joncryl | 41.7 | 0.13 |

Although various examples of the disclosed paperboard structures and biopolymer coatings have been shown and described, modifications may occur to those skilled in the art upon reading the specification. The present application includes such modifications and is limited only by the scope of the claims.

What is claimed is:

1. A paperboard structure comprising:
a paperboard substrate having a first surface and an opposed second surface; and
a biopolymer coating applied by extrusion or co-extrusion to at least one of the first surface and the second surface, wherein the biopolymer coating comprises:
an inorganic melt curtain stabilizer;
a first polylactide resin having a first melt flow index;
a second polylactide resin having a second melt flow index different from the first melt flow index; and
an organic polymeric chain extender.

2. The paperboard structure of claim 1 wherein a coat weight of the biopolymer coating is less than 22 pounds per 3000 $ft^2$.

3. The paperboard structure of claim 1 wherein the biopolymer coating is heat sealable.

4. The paperboard structure of claim 1 wherein the inorganic melt curtain stabilizer comprises at least one of calcium carbonate, talc, mica, diatomaceous earth, silica, clay, kaolin, wollastonite, pumice, zeolite, and ceramic spheres.

5. The paperboard structure of claim 1 wherein the biopolymer coating comprises a biodegradable polymer.

6. The paperboard structure of claim 1 wherein the biopolymer coating comprises a biodegradable polyester.

7. The paperboard structure of claim 1 wherein the biopolymer coating comprises an adhesion-promoting polymer, and wherein the adhesion-promoting polymer comprises at least one of aliphatic-aromatic copolyester polybutylene succinate, polyhydroxyalkanoate, aliphatic-polyester, aliphatic-aromatic polyester, acrylic polymer, elastomer, and plasticizer.

8. The paperboard structure of claim 1 wherein the biopolymer coating comprises aliphatic-aromatic polyester.

9. The paperboard structure of claim 1 wherein the biopolymer coating is one of a monolayer blend and a co-extruded multilayer blend.

10. The paperboard structure of claim 1 wherein the inorganic melt curtain stabilizer comprises from about 1% to about 25% by weight of the biopolymer coating.

11. The paperboard structure of claim 1 wherein the first melt flow index of the first polylactide resin is at least 10 percent greater than the second melt flow index of the second polylactide resin.

12. The paperboard structure of claim 1 wherein the difference between the first melt flow index of the first polylactide resin and the second melt flow index of the second polylactide resin is at least 2 g/10 min at 210° C./2.16 kg.

13. The paperboard structure of claim 1 wherein the first melt flow index of the first polylactide resin is 4-8 g/10 min at 210° C./2.16 kg and the second melt flow index of the second polylactide resin is 12-16 g/10 min at 210° C./2.16 kg.

14. The paperboard structure of claim 1 wherein the biopolymer coating comprises a third polylactide resin having a third melt flow index different from the first melt flow index and the second melt flow index.

15. A container comprising the paperboard structure of claim 1.

16. The container of claim 15 configured as a drinking cup.

17. A method for manufacturing a paperboard structure, the method comprising:
applying by extrusion or co-extrusion a biopolymer coating to at least one of a first surface and an opposed second surface of a paperboard substrate, wherein the biopolymer coating comprises:

an inorganic melt curtain stabilizer;

a first polylactide resin having a first melt flow index;

a second polylactide resin having a second melt flow index different from the first melt flow index; and an organic polymeric chain extender.

18. The method of claim 17, wherein the first melt flow index of the first polylactide resin is at least 10 percent greater than the second melt flow index of the second polylactide resin.

19. The method of claim 17, wherein the difference between the first melt flow index of the first polylactide resin and the second melt flow index of the second polylactide resin is at least 2 g/10 min at 210° C./2.16 kg.

20. The method of claim 17, further comprising heat sealing the paperboard structure via the biopolymer coating.

* * * * *